(12) United States Patent
Konamki Vijayamuneeswaralu et al.

(10) Patent No.: US 12,743,380 B2
(45) Date of Patent: Sep. 22, 2026

(54) CACHING A MEMORY DESCRIPTOR FOR PLURAL INPUT/OUTPUT REQUESTS

(71) Applicant: Microsoft Technology Licensing, LLC, Redmond, WA (US)

(72) Inventors: Chandra Kumar Konamki Vijayamuneeswaralu, Redmond, WA (US); Neal Robert Christiansen, Bellevue, WA (US); Landy Wang, Honolulu, HI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/850,985

(22) PCT Filed: Mar. 23, 2023

(86) PCT No.: PCT/US2023/016063
§ 371 (c)(1),
(2) Date: Sep. 25, 2024

(87) PCT Pub. No.: WO2023/196118
PCT Pub. Date: Oct. 12, 2023

(65) Prior Publication Data

US 2025/0231882 A1 Jul. 17, 2025

(30) Foreign Application Priority Data

Apr. 4, 2022 (LU) .................................. LU501792

(51) Int. Cl.
*G06F 12/00* (2006.01)
*G06F 12/02* (2006.01)
(Continued)

(52) U.S. Cl.
CPC ...... *G06F 12/0882* (2013.01); *G06F 12/0246* (2013.01); *G06F 12/0868* (2013.01); *G06F 2212/7203* (2013.01)

(58) Field of Classification Search
None
See application file for complete search history.

(56) References Cited

U.S. PATENT DOCUMENTS 6,523,102 B1 2/2003 Dye
7,287,101 B2 10/2007 Futral
(Continued)

OTHER PUBLICATIONS

International Search Report and Written Opinion received for PCT Application No. PCT/US23/016063, (MS# 411131-PCT01) mailed on Jun. 26, 2023, 17 Pages.
(Continued)

*Primary Examiner* — Daniel D Tsui
(74) *Attorney, Agent, or Firm* — Workman Nydegger

(57) ABSTRACT

Caching a memory descriptor across input/output (I/O) requests. Based at least on receiving a request from a buffer consumer to register a buffer, a memory descriptor describing a layout of a set of physical memory pages assigned to the buffer is created. Creating the memory descriptor includes assigning and locking the set of physical memory pages to the memory descriptor. For each I/O request of a plurality of I/O requests on the buffer, at least a subset of the memory descriptor for use by the I/O request is returned, and a reference count is used to track the I/O request as pending on the memory descriptor. Later, the memory descriptor is destroyed, including unlocking the set of physical memory pages, based at least on the reference count indicating that there is no pending I/O request on the memory descriptor.

20 Claims, 5 Drawing Sheets

(51) Int. Cl.
*G06F 12/0868* (2016.01)
*G06F 12/0882* (2016.01)

(56) References Cited

U.S. PATENT DOCUMENTS

| | | | | |
|---|---|---|---|---|
| 2005/0033874 | A1 | 2/2005 | Futral et al. | |
| 2012/0311202 | A1* | 12/2012 | Aslot | G06F 13/387 710/55 |
| 2018/0173656 | A1* | 6/2018 | Wilson | G06F 13/28 |

OTHER PUBLICATIONS

Search Report Issued in Luxembourg Patent Application No. LU501792, (MS# 411131-LU01) mailed on Nov. 4, 2022, 7 Pages.
Communication under Rule 71(3) EPC Received in European Patent Application No. 23716975.0, mailed on Apr. 15, 2026, 08 pages.

* cited by examiner

300

Buffer Entry 301 (115a)

Flags 302

Address Range 303

MDL 304

Reference Count 305

PtoB Nodes 306

Figure 4:
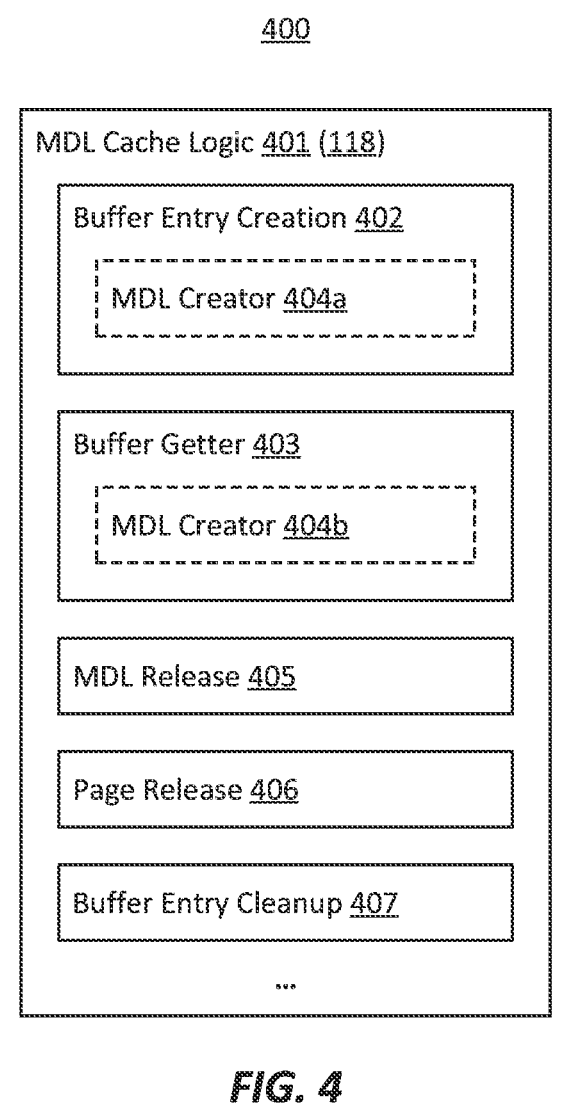

MDL Cache Logic 401 (118)

Buffer Entry Creation 402

MDL Creator 404a

Buffer Getter 403

MDL Creator 404b

MDL Release 405

Page Release 406

Buffer Entry Cleanup 407

CACHING A MEMORY DESCRIPTOR FOR PLURAL INPUT/OUTPUT REQUESTS

CROSS-REFERENCE TO RELATED APPLICATIONS

The present application is a U.S. National Stage of International Application No. PCT/US2023/016063, filed on 23 Mar. 2023, designating the United States and claiming the priority of Luxembourg Patent Application No. LU501792 filed with the Luxembourg Intellectual Property Office on 4 Apr. 2022. All of the aforementioned applications are incorporated herein in their respective entirety by this reference.

TECHNICAL FIELD

The present disclosure relates to systems, methods, and devices that manage memory page mappings for input/output (I/O) buffers.

BACKGROUND

When a user mode process needs to perform an I/O operation (e.g., to read from, or write to, a file or some other memory buffer), the user mode process sends an I/O request to an operating system (OS) kernel. This I/O request comprises a memory offset and a length, which together define a virtual memory region corresponding to the requested I/O. The OS kernel verifies that this virtual memory region is within a valid memory buffer, and then probes-and-locks one or more physical memory pages to the virtual memory region. In doing a probes-and-lock, the OS kernel generates a mapping between virtual memory pages and physical memory pages, and locks those physical memory pages, ensuring that a subsequent access to the virtual memory region will not incur a page fault, and enabling a device to update the physical pages directly and have the update reflected in the virtual memory region. In some operating systems, such as WINDOWS from MICROSOFT CORPORATION, this mapping between virtual memory pages and physical memory pages can be represented by a memory descriptor list (MDL). Once the requested I/O operation is completed, the OS kernel releases the lock on the physical memory pages, and discards the MDL. Thus, for each valid I/O request, the OS performs a probe-and-lock on one or more physical memory pages, and holds that lock for the duration of the I/O request.

Some scenarios, such as graphics rendering, generate a great number of I/O operations—such as to load texture bitmaps into graphics processing unit (GPU) memory. In order to avoid having a call from user mode to kernel mode for each of these I/O operations, some OS kernels have implemented an I/O mechanism called "IORing" (e.g., io_uring in LINUX or IORING in WINDOWS). Using IORing, a user mode process pre-allocates a plurality of buffers with the OS kernel (e.g., giving the OS kernel an array of buffers, with each buffer identifiable by the user mode process based on an offset within the array), uses a submission queue to queue a plurality of I/O requests on those buffers, and then submits those I/O requests. After submission of those I/O requests, the OS kernel processes them by issuing parallel and asynchronous I/O operations, and places the results of those I/O operations in a completion queue.

BRIEF SUMMARY

In some aspects, the techniques described herein relate to a method, implemented at a computer system that includes a processor, for caching a memory descriptor across a plurality of I/O requests, the method including: based at least on receiving a request from a buffer consumer to register a buffer, creating memory descriptor that describes a layout of a set of physical memory pages assigned to the buffer, creating the memory descriptor including assigning and locking the set of physical memory pages to the memory descriptor; for each I/O request of a plurality of I/O requests on the buffer: returning at least a subset of the memory descriptor for use by the I/O request, and using a reference count to track the I/O request as being pending on the memory descriptor; and releasing the memory descriptor, including unlocking the set of physical memory pages, based at least on the reference count indicating that there is no pending I/O request on the memory descriptor.

In some aspects, the techniques described herein relate to a computer system for caching a memory descriptor across a plurality of I/O requests, including: a processor; and a computer storage media that stores computer-executable instructions that are executable by the processor to cause the computer system to at least: based at least on receiving a request from a buffer consumer to register a buffer, create a memory descriptor that describes a layout of a set of physical memory pages assigned to the buffer, creating the memory descriptor including assigning and locking the set of physical memory pages to the memory descriptor; for each I/O request of a plurality of I/O requests on the buffer: return at least a subset of the memory descriptor for use by the I/O request, and use a reference count to track the I/O request as being pending on the memory descriptor; and release the memory descriptor, including unlocking the set of physical memory pages, based at least on the reference count indicating that there is no pending I/O request on the memory descriptor.

In some aspects, the techniques described herein relate to a computer program product comprising a computer storage media that stores computer-executable instructions that are executable by a processor to cause a computer system to at least: based at least on receiving a request from a buffer consumer to register a buffer, create a memory descriptor that describes a layout of a set of physical memory pages assigned to the buffer, creating the memory descriptor including assigning and locking the set of physical memory pages to the memory descriptor; for each I/O request of a plurality of I/O requests on the buffer: return at least a subset of the memory descriptor for use by the I/O request, and use a reference count to track the I/O request as being pending on the memory descriptor; and release the memory descriptor, including unlocking the set of physical memory pages, based at least on the reference count indicating that there is no pending I/O request on the memory descriptor.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the systems and methods briefly described above will be rendered by reference to specific embodiments thereof which are illustrated in the appended drawings. Understanding that these drawings depict only typical embodiments of the systems and methods and are not therefore to be considered to be limiting of its scope, the systems and methods will be described and explained with additional specificity and detail through the use of the accompanying drawings in which:

FIG. 3 illustrates an example of an MDL cache buffer entry;

FIG. 4 illustrates an example of MDL cache logic; and

DETAILED DESCRIPTION

Figure 1:
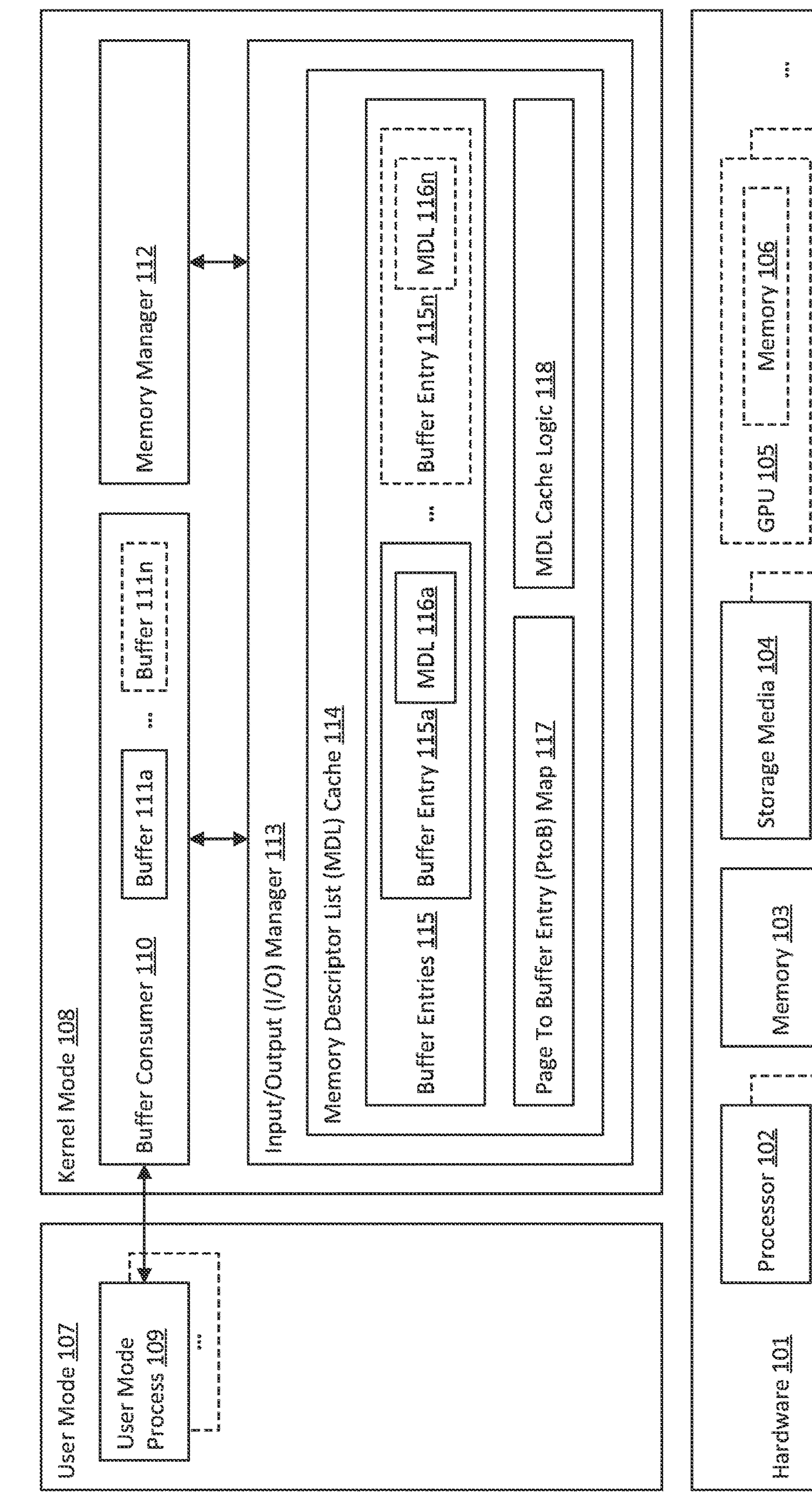
FIG. 1 illustrates an example computer architecture that facilitates caching a memory descriptor for plural I/O requests.

At least some embodiments herein provide a cache that caches a memory descriptor data structure, such as an MDL, for a buffer across a plurality of I/O operations on the buffer, resulting in a probe- and lock of the underlying physical memory pages being held over a plurality of I/O operations. For example, in the context of IORing, at least some embodiments herein cache a memory descriptor for a pre-allocated buffer used by a plurality of I/O operations on the buffer. By caching memory descriptors for a plurality of I/O operations on a buffer, the performance of each I/O operation is improved. For example, in experiments this leads to approximately a 10% reduction in processor utilization. Thus, locking memory pages for extended periods of time improves system behavior.

However, while improving system behavior, having long-standing probe-and-locks on physical memory pages can lead to some negative impacts. For example, having physical memory pages probed-and-locked over extended periods of time can negatively impact an OS kernel's success rate at constructing large (64K, 2 M, 1 G) memory pages on the fly, because an OS kernel's memory manager may not be able to locate large enough contiguous physical memory regions. Additionally, having physical memory pages probed-and-locked over extended periods of time means that a memory manager may need to examine physical memory addresses at the page level (e.g., page frame numbers), instead of at the level of larger clusters of pages (e.g., 64K/2 M/1 G), thus leading to longer scans (regardless of success rate) when requested to allocate either large memory pages or memory with physical address restrictions. Additionally, having physical memory pages probed-and-locked over extended periods of time means that if a hardware patrol scrub finds an error in those pages, the memory manager would not be able to remove faulty pages, and software would not be able to scan those pages—both of which can lead to fatal system errors. Finally, GPU memory access is typically windowed, requiring GPU physical memory to be re-mapped to expose different windows (e.g., 256 M) into that GPU memory. When GPU physical memory pages are probed-and-locked over extended periods of time, the GPU driver may be unable to perform those re-mappings; additionally, the GPU cannot be powered down while GPU memory pages are locked by an OS kernel.

At least some embodiments herein address each of these negative impacts of having long-standing probe-and-locks on physical memory pages, while still preserving I/O performance improvements achieved by long-standing probe-and-locks on physical memory pages. In particular, at least some embodiments herein provide a cache that caches memory descriptors across I/O requests, which maintains probed-and-locked memory pages across those I/O requests. However, in addition to caching memory descriptors across I/O requests, the memory descriptor cache described herein implements a system of reference counts that enables a cached memory descriptor to be released (and any corresponding probed-and-locked memory pages to be unlocked) based upon a request by a memory manger (e.g., based on a physical page address) and/or by a memory buffer consumer—such as IORing.

By enabling cached memory descriptors to be released upon request, the embodiments herein enable the memory manager to free physical memory pages when needed. This improves an OS kernel's success rate at constructing large memory pages (64K, 2 M, 1 G) on the fly and improves memory manager performance when doing so. This also enables hardware and software to scan for—and remove—faulty pages, preventing fatal system errors, and enables a GPU to timely perform GPU memory window mappings and unlock GPU memory pages to power down.

FIG. 1 illustrates an example computer architecture 100 that facilitates caching a memory descriptor for plural I/O requests. As shown, computer architecture 100 includes a computer system (hardware 101) comprising a processor 102 (or a plurality of processors), a memory 103, and one or more computer storage media (storage media 104). In embodiments, hardware 101 also includes a GPU 105 (or a plurality of GPUs), or a variety of other hardware (as indicated by the ellipses within hardware 101).

In embodiments, the storage media 104 stores computer-executable instructions implementing one or more software components that execute at the processor 102, such as an OS that provides a user mode 107 context and a kernel mode 108 context. As shown within user mode 107, the processor 102 executes a user mode process 109 (or a plurality of user mode processes). As shown within kernel mode 108, the processor 102 executes (among other things) a buffer consumer 110, a memory manager 112, and an I/O manager 113.

In accordance with the embodiments herein, the buffer consumer 110 interfaces with the I/O manager 113 to probe-and-lock physical memory pages for one or more buffers (e.g., buffer 111*a* to buffer 111*n*) over multiple I/O operations (e.g., as requested by user mode process 109). In one example, the buffer consumer 110 is an IORing component (e.g., io_uring in LINUX or IORING in WINDOWS), which pre-allocates one or more buffers (e.g., buffer 111*a* to buffer 111*n*) based on request(s) from the user mode process 109, and which executes plural I/O operations on those buffers—potentially as parallel asynchronous operations.

As used herein, a "memory descriptor" is a data structure that describe a physical page layout for a virtual memory buffer (e.g., a mapping between physical memory pages and virtual memory pages). While a memory descriptor can take a variety of forms, one example of a memory descriptor is a memory descriptor list (MDL) used by the WINDOWS operating system from MICROSOFT CORPORATION. For clarity and brevity, the description herein describes an example of an MDL cache that caches MDLs. It will be appreciated, however, that the term "memory descriptor" is applicable to data structures other than MDLs.

The I/O manager 113 is illustrated as including an MDL cache 114. In embodiments, the MDL cache 114 preserves (e.g., caches) one or more MDLs (e.g., MDL 116*a* to MDL 116*n*) across I/O requests from the buffer consumer 110. Preserving MDLs across I/O requests maintains probed-andlocked memory pages across those I/O requests. In addition, in embodiments, the MDL cache 114 utilizes reference counts to enable any cached MDL to be released (and any corresponding probed-and-locked memory pages to be unlocked) based upon a request by the memory manager 112 and/or by the buffer consumer 110.

To the accomplishment of the foregoing, in embodiments the MDL cache 114 provides (e.g., as part of MDL cache logic 118) one or more application programming interfaces (APIs) that enable calls from the memory manager 112 and/or from the buffer consumer 110, and some particular example APIs are described herein. It will be appreciated, however, that that example APIs are illustrative only. In other embodiments, a different number and function of APIs could be provided by the MDL cache logic 401.

FIG. 4 illustrates an example 400 of MDL cache logic 401, such as MDL cache logic 118 of FIG. 1. In example 400, the MDL cache logic 401 includes a buffer entry creation component 402, a buffer getter component 403, an MDL release component 405, a page release component 406, and a buffer entry cleanup component 407. The ellipses indicate that in other examples the MDL cache logic 401 could include one or more additional (or alternative) components. Each component of the MDL cache logic 401 depicted in FIG. 4 represents various functionalities that the MDL cache logic 401 might implement in accordance with various embodiments described herein. It will be appreciated, however, that the depicted components—including their identity and arrangement—are presented merely as an aid in describing various embodiments of the MDL cache logic 401.

In embodiments, a first API—hereinafter referred to as CreateBufferEntry( . . . )—enables the buffer consumer 110 to call the MDL cache 114 to register a buffer (e.g., buffer 111*a*) with the MDL cache 114, based on providing the MDL cache 114 with at least an address range (e.g., starting address and length). In embodiments, based on a call by the buffer consumer 110 to the CreateBufferEntry( . . . ) API, the buffer entry creation component 402 creates a "BufferEntry" object for a specified buffer, and inserts the newly created BufferEntry object into a collection (e.g., array, list, etc.) of BufferEntry objects. Thus, the MDL cache 114 is illustrated as comprising buffer entries 115, including buffer entry 115*a* (e.g., corresponding to buffer 111*a*) to buffer entry 115*n* (e.g., corresponding to buffer 111*n*).

Figure 3:
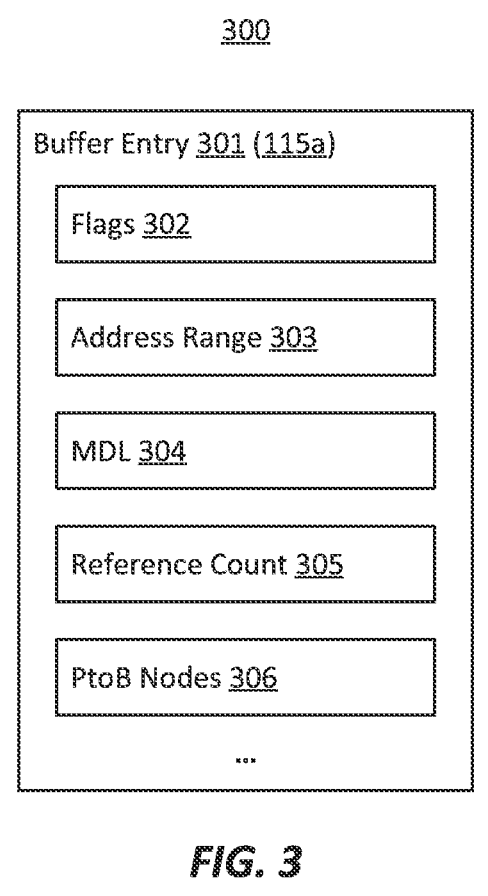

FIG. 3 illustrates an example 300 of a buffer entry 301 for an MDL cache, such as buffer entry 115*a* of FIG. 1. In example 300, the buffer entry 301 includes (or is associated with) one or more flags 302, an address range 303, an MDL 304 (e.g., MDL 116*a*), a reference count 305, and page-to-buffer entry (PtoB) nodes (PtoB nodes 306). The ellipses indicate that buffer entry 301 could include one or more additional (or alternative) elements.

In some embodiments, the flags 302 include a first flag (e.g., UNLOCK) that, when set, indicates that the MDL corresponding to this BufferEntry object cannot be used for new I/O operations. In embodiments, the buffer entry creation component 402 initializes this first flag to an unset state (e.g., a binary zero). In embodiments, this first flag is changed to a set state (e.g., a binary one) when (i) there is a callback (e.g., to a TryReleasePage( . . . ) API, discussed infra) from the memory manager 112 to unlock a physical page associated with the MDL for this BufferEntry object, and when (ii) that MDL is being actively used for I/O operations (e.g., when the reference count 305 is non-zero). In embodiments, inclusion of the first flag has a technical benefit of enabling a BufferEntry object to indicate whether it can accept new I/O operations.

In some embodiments, the flags 302 include a second flag (e.g., SIGNAL_RUNDOWN) that, when in a set state (e.g., a binary one), indicates that a thread dropping a reference to the MDL associated with this BufferEntry object to zero should signal a rundown event. In embodiments, the rundown event is used to wait for outstanding references to that MDL to drop (e.g., wait for pending I/O operations to complete) before cleaning up the BufferEntry object. In embodiments, the buffer entry creation component 402 initializes this second flag to an unset state (e.g., a binary zero). In embodiments, inclusion of the second flag has a technical benefit of enabling a BufferEntry object to indicate that I/O operations relating to the BufferEntry object are being drained.

In some embodiments, the flags 302 include a third flag (e.g., CLEANED_UP) that, when in a set state (e.g., a binary one), persistently indicates that this BufferEntry object is cleaned up and cannot be used for new I/O operations. In embodiments, the buffer entry creation component 402 initializes third flag to an unset state (e.g., a binary zero). In embodiments, inclusion of the third flag has a technical benefit of enabling a BufferEntry object to indicate whether it can ever be used for new I/O operations.

In embodiments, the address range 303 is a range of memory addresses that this BufferEntry object manages. In embodiments, the buffer entry creation component 402 initializes the address range 303 based on a buffer starting address and a buffer length provided by the buffer consumer 110 as part of a call to the CreateBufferEntry( . . . ) API. In embodiments, inclusion of the address range 303 has a technical benefit of enabling a BufferEntry object to indicate a virtual memory buffer that it manages.

In embodiments, the MDL 304 is an MDL object for this BufferEntry object. This MDL object may be part of the BufferEntry object, itself, or may be stored separate from the BufferEntry object. In some embodiments, the buffer entry creation component 402 uses an MDL creator component 404*a* to create and probe-and-lock this MDL object upon creation of this BufferEntry object. In other embodiments, however, the buffer entry creation component 402 calculates and allocates an amount of space needed to store the MDL object, but the MDL cache 114 defers creation of the MDL object until an initial I/O operation in reference to this BufferEntry object (e.g., an initial call to a GetBuffer( . . . ) API, discussed infra).

In embodiments, the reference count 305 is a reference count on the MDL 304 associated with this BufferEntry object. In embodiments, buffer entry creation component 402 sets the reference count 305 to one upon creation of the BufferEntry object. In embodiments, this reference count 305 is incremented for each I/O operation that references this BufferEntry object and is decremented when each I/O operation completes. In embodiments, the BufferEntry object is freed when the reference count 305 reaches zero.

In embodiments, for each BufferEntry object, the MDL cache 114 populates a PtoB map 117 that has entries that each maps a physical page address (e.g., page frame number) to a reference to (e.g., a memory addresses of) a BufferEntry objects comprising an MDL covering that physical page address. In embodiments, each entry is a node in an Adelson-Velsky and Landis (AVL) tree. In other embodiments, the PtoB map 117 is a hash table, a rotating skip list, or any other data structure that acts as an efficient map. In embodiments, if the buffer entry creation component 402 creates and probes-and-locks this MDL object upon creation of this BufferEntry object, then the buffer entry creation component 402 also creates PtoB nodes 306 for this BufferEntry, and inserts those node(s) into the PtoB map 117. In embodiments, if the MDL cache 114 defers creation of the MDL object until an initial I/O operation, then the buffer entry creation component 402 calculates an allocates an amount of space needed to store the PtoB nodes 306.

In embodiments, the buffer entry creation component 402 returns a reference (e.g., memory address) corresponding to the newly created BufferEntry object to the caller, such as buffer consumer 110. Thus, the caller (e.g., buffer consumer 110) can use this reference to refer to the newly created BufferEntry object later. In an embodiment, the buffer consumer 110 stores these references in one or more arrays, such that the buffer consumer 110 can locate a reference to a BufferEntry object based on an offset within that array. In an embodiment, if the buffer consumer 110 is a IORing component, the buffer consumer 110 may maintain a different IORing object for each array of buffers registered by a user mode process (e.g., user mode process 109). In this embodiment, the buffer consumer 110 may maintain a corresponding array of BufferEntry object references for each IORing object, with this array being usable to identify a particular BufferEntry object based on the offset used by the user mode process to refer to the corresponding buffer.

Figure 2:
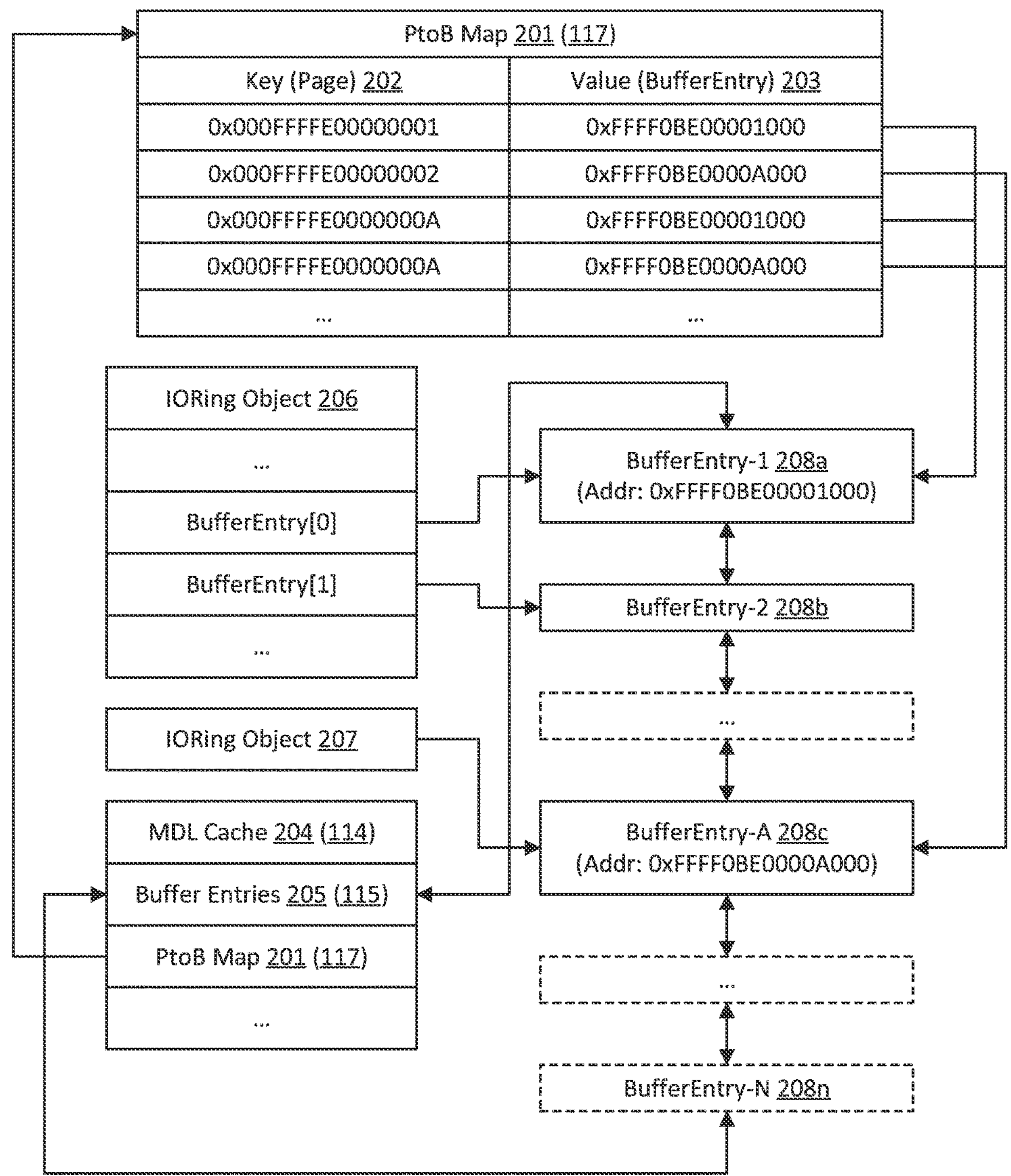
FIG. 2 illustrates an example of MDL cache data structures.

FIG. 2 illustrates an example 200 of MDL cache data structures. In example 200, an MDL cache 204 (e.g., MDL cache 114) comprises buffer entries 205 (e.g., buffer entries 115). As shown, the buffer entries 205 comprises a plurality of BufferEntry objects (e.g., as an array, as a list), including BufferEntry objects for buffers (e.g., buffer 111*a* to buffer 111*n*) defined by an IORing object 206 and an IORing object 207 within the buffer consumer 110. For example, IORing object 206 is shown as storing an array of references to BufferEntry objects, including a reference (in this case, address 0xFFFF0BE00001000) to BufferEntry-1 208*a* at offset zero within this array, and a reference to BufferEntry-2 208*b* at offset one within this array. Additionally, IORing object 207 is shown as storing a reference (in this case, address 0xFFFF0BE0000A000) to BufferEntry-A 208*c*. In example 200, the MDL cache 204 also comprises a PtoB map 201 (e.g., PtoB map 117). As shown, the PtoB map 201 stores mappings between physical memory pages (e.g., key 202) and references to BufferEntry objects (e.g., value 203). Thus, for example, physical memory page 0x000FFFFE00000001 maps to BufferEntry-1 208*a* page (address 0xFFFF0BE00001000), physical memory 0x000FFFFE00000002 maps to BufferEntry-A 208*c* (address 0xFFFF0BE0000A000), and physical memory page 0x000FFFFE0000000A maps to both BufferEntry-1 208*a* and BufferEntry-A 208*c*.

In embodiments, a second API—hereinafter referred to as GetBuffer( . . . )—enables the buffer consumer 110 to call the MDL cache 114 to get an MDL for at least a portion of a buffer previously registered by a call to CreateBufferEntry ( . . . ). In embodiments, based on a call by the buffer consumer 110 to GetBuffer( . . . ) with a reference to a BufferEntry object, the buffer getter component 403 initially determines if either the first flag (e.g., UNLOCK) or the third flag (e.g., CLEANED_UP) is set for the requested BufferEntry object, and if so the buffer getter component 403 doesn't use the already-created MDL within the BufferEntry object. This means that the I/O system will create and probe-and-lock a new uncached MDL using conventional techniques (e.g., such that the new uncached MDL is used for a single I/O operation).

In embodiments, if neither the first flag nor the third flag is set for the requested BufferEntry object, the buffer getter component 403 determines if an MDL has already been created for the BufferEntry object. If so, the buffer getter component 403 increments the BufferEntry object's reference count, and returns BufferEntry object's MDL. In some embodiments, the GetBuffer( . . . ) API also receives an offset and length, and the buffer getter component 403 returns a partial MDL covering only a subset of the buffer. If no MDL has been created for the BufferEntry object, the buffer getter component 403 creates and probes-and-locks a "full" MDL for the BufferEntry object (e.g., using an MDL creator component 404*b*), increments the BufferEntry object's reference count, populates the PtoB map 117 with physical page addressees covered by the MDL referencing back to the BufferEntry object, and returns either the full MDL or a partial portion of the MDL (based on a received offset and length).

In embodiments, there could be a failure by the buffer getter component 403 to build/return an MDL (e.g., full or partial) after a call to GetBuffer( . . . ). In embodiments, this is not considered to be fatal error and an I/O request for which the call was made can still be issued (e.g., by the I/O manager 113). In embodiments, in these circumstances, an I/O operation proceeds using conventional techniques—e.g., creating and probing-and-locking an MDL that is specific to the I/O operation and that is not cached by the MDL cache 114.

In embodiments, a third API—hereinafter referred to as ReleaseMDL( . . . )—releases a partial (or full) MDL. In embodiments, based on a call by the buffer consumer 110 to ReleaseMDL( . . . ) with a reference to an MDL, the MDL release component 405 decrements the corresponding BufferEntry object's reference count. Then, if the reference count is zero and the first flag (e.g., UNLOCK) is set, the MDL release component 405 releases/tears down the BufferEntry object's MDL. Additionally, if the reference count is zero and the second flag (e.g., SIGNAL_RUNDOWN) is set, the MDL release component 405 signals a BufferEntry rundown event, as this was the last I/O using the BufferEntry object's MDL.

In embodiments, a fourth API—hereinafter referred to as TryReleasePage( . . . )—enables the memory manager 112 to unlock a memory page that is opportunistically locked by a cached MDL (e.g., on behalf of a GPU driver to unlock a page in memory 106, on behalf of a component needing contiguous memory, on behalf a component that has identified pages going bad). In embodiments, based on a call by the memory manager 112 to TryRelease Page( . . . ) with an address of a requested physical memory page (e.g., a page frame number), the page release component 406 uses the PtoB map 117 to determine if there exists a BufferEntry object that corresponds to the requested physical memory page. If the page release component 406 identifies a BufferEntry object having an associated MDL that is not currently active (e.g., the BufferEntry object's reference count is zero), then the page release component 406 unlocks and frees the MDL and returns success, indicating that the memory manager 112 should retry its attempt to take the physical memory page. If the page release component 406 identifies a BufferEntry object having an associated MDL that is being actively used by I/O operations (e.g., the BufferEntry object's reference count is non-zero), then the page release component 406 sets the first flag (e.g., UNLOCK) (preventing future I/O operations from utilizing the MDL) and returns a locked status. In this case, the memory manager 112 treats the BufferEntry object's MDL as being temporarily active, and can retry later (e.g., waiting for the active I/O operations on the MDL drain out). If the memory manager 112 called TryReleasePage( . . . ) in response to a request from another component (e.g., a graphics driver requesting to release a page in memory 106), and the page release component 406 returns a locked status, then the memory manager 112 may return failure to that component (which can retry again later). In some embodiments, a call to TryReleasePage( . . . ) (or similar API) results in draining I/O operations from all cached MDLs (e.g., all of buffer entries 115), not just one corresponding to a requested memory page.

Notably, in some embodiments, a call to TryReleasePage ( . . . ) results in a partial teardown of an MDL. For example, embodiments may track reference counts on a page-by-page basis, rather than for an entire MDL. Then, when an MDL is being actively used by I/O operations, if the reference count on the requested page within the MDL is zero, the page release component 406 could create a temporary MDL with all pages in the original MDL that have reference counts of zero, unlock those pages, and replace corresponding pages in the original MDL with dummy page addresses. In embodiments, doing so would enable the memory manager 112 to unlock pages of interest immediately, instead of having to wait for pending I/O operations to complete on the entire MDL.

In embodiments, a fifth API—hereinafter referred to as WaitAndCleanupBufferEntry( . . . )—is called by the buffer consumer 110 with a reference to a BufferEntry object in order to remove that BufferEntry object. In embodiments, based on a call by the buffer consumer 110 to WaitAndCleanupBufferEntry( . . . ), the buffer entry cleanup component 407 sets a flag (e.g., the second flag, SIGNAL_RUNDOWN) to have a rundown event, on the requested BufferEntry object, signaled. Then, if the BufferEntry object's reference count is non-zero, the buffer entry cleanup component 407 waits for the rundown event to complete. In embodiments, once the BufferEntry object's reference count is zero, the thread dropping the reference count to zero signals a rundown event, and calls the buffer entry cleanup component 407, which unlocks the BufferEntry object's MDL, removes the BufferEntry object from buffer entries 115, and deletes the BufferEntry object.

The operation of the MDL cache 114 is now described in connection with FIG. 5, which illustrates a flow chart of an example method 500 for caching a memory descriptor across a plurality of I/O requests. In embodiments, instructions for implementing method 500 are encoded as computer-executable instructions (e.g., MDL cache logic 118, 401) stored on a computer storage media (e.g., storage media 104) that are executable by a processor (e.g., processor 102) to cause a computer system (e.g., hardware 101) to perform method 500.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 5:
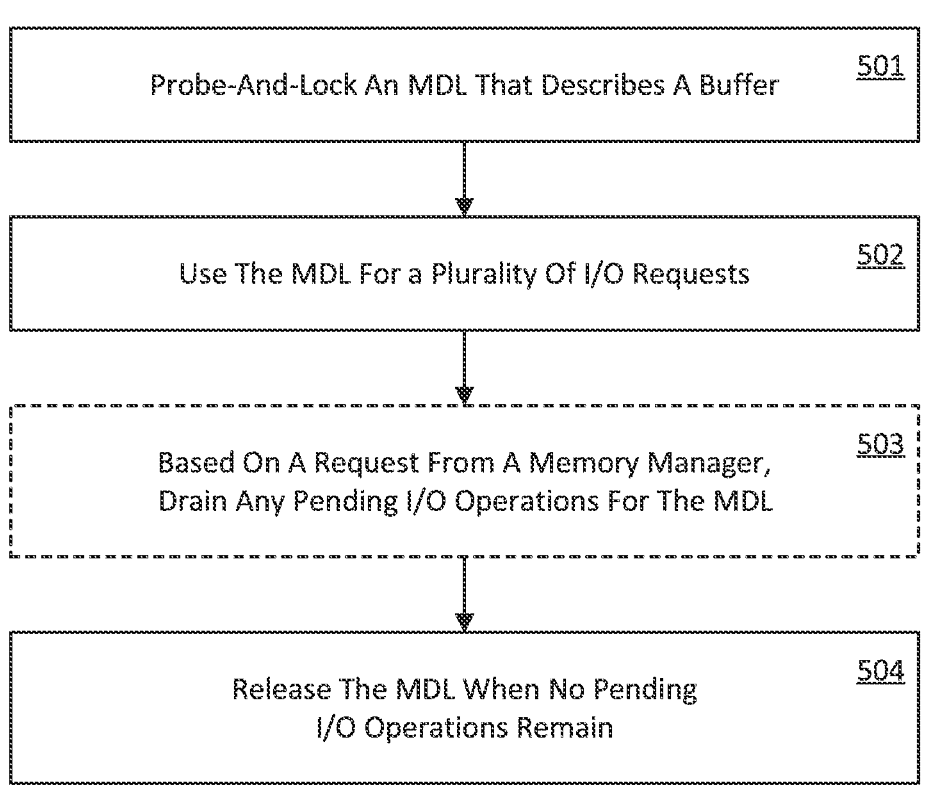
FIG. 5 illustrates a flow chart of an example method for caching a memory descriptor across a plurality of I/O requests.

Referring to FIG. 5, in embodiments, method 500 comprises an act 501 of probing-and-locking an MDL that describes a buffer. In some embodiments, act 501 comprises, based at least on receiving a request from a buffer consumer to register a buffer, creating a memory descriptor that describes a layout of a set of physical memory pages assigned to the buffer, creating the memory descriptor including assigning and locking a set of physical memory pages to the memory descriptor. In an example, based at least on (e.g., in response to) registering buffer 111*a* on behalf of the buffer consumer 110, an MDL creator component 404 (e.g., MDL creator component 404*a* or MDL creator component 404*b*) creates MDL 116*a* corresponding to buffer 111*a*. Technical effects of act 501 include the creation of a memory descriptor (e.g., an MDL), which enables a buffer consumer to perform one or more I/O operations on a buffer. While buffer consumer 110 can be a wide variety of components, in some embodiments of act 501, the buffer consumer is an IORing component, and the buffer is an IORing user registered buffer.

As shown in FIG. 1, in embodiments an MDL is associated with a BufferEntry object. Thus, in some embodiments, based at least on receiving the request from a buffer consumer to register the buffer, method 500 includes creating a buffer entry data structure that includes a starting address and a buffer length for the buffer, and inserting the buffer entry data structure into a buffer entry list. For example, based on a call by the buffer consumer 110 to CreateBufferEntry( . . . ) with a starting address and length of buffer 111*a*, the buffer entry creation component 402 creates buffer entry 115*a*, and inserts that buffer entry 115*a* into buffer entries 115. In embodiments, the buffer entry creation component 402 also returns a reference to buffer entry 115*a* to buffer consumer 110. Thus, in some embodiments, method 500 includes returning an address of the buffer entry data structure to the buffer consumer.

As discussed, in some embodiments, the buffer entry creation component 402 uses an MDL creator component 404*a* to create and probe-and-lock an MDL object upon creation of a BufferEntry object. Thus, in some embodiments of act 501, assigning and locking the set of physical memory pages to the memory descriptor is triggered by the request to register the buffer. For example, based on a call by the buffer consumer 110 to CreateBufferEntry( . . . ), MDL creator component 404*a* creates MDL 116*a*. In other embodiments, the MDL cache 114 defers creation of the MDL object until an initial I/O operation in reference to a BufferEntry object. Thus, in some embodiments, assigning and locking the set of physical memory pages to the memory descriptor is triggered by receiving an initial I/O request in the plurality of I/O requests. For example, based on a call by the buffer consumer 110 to GetBuffer( . . . ), MDL creator component 404*b* creates MDL 116*a*.

Whether MDL 116*a* was created by the MDL creator component 404*a* at buffer registration (e.g., creation of a BufferEntry object), or by the MDL creator component 404*b* when a buffer is requested for an I/O operation, the underlying physical memory pages are added to the PtoB map 117, in reference to the BufferEntry object. Thus, in some embodiments, method 500 also comprises, based at least on assigning and locking the set of physical memory pages to the memory descriptor, adding to a P2B map, a mapping between the set of physical memory pages and a reference to the buffer entry data structure.

Method 500 also comprises an act 502 of using the MDL for a plurality of I/O requests. In some embodiments, act 502 comprises, for each I/O request of a plurality of I/O requests on the buffer, returning at least a subset of the memory descriptor for use by the I/O request, and using a reference count to track the I/O request as being pending on the memory descriptor. In an example, when the buffer consumer 110 needs an MDL for an I/O operation, the buffer consumer 110 calls GetBuffer( . . . ) for a BufferEntry object, resulting in an increment to the BufferEntry object's reference count by the buffer getter component 403. Additionally, when the buffer consumer 110 is done with an MDL (e.g., because the I/O operation completed), the buffer consumer 110 calls ReleaseMDL( . . . ), resulting in decrement to the BufferEntry object's reference count. Thus, in some embodiments, using the reference count to track each I/O request as being pending on the memory descriptor comprises incrementing the reference count based on receiving a request from the buffer consumer for at least the subset of the memory descriptor for use by the I/O request, and decrementing the reference count based on a receiving request from the buffer consumer to release at least the subset of the memory descriptor based at least on assigning and locking the set of physical memory pages used by the I/O request. Technical effects of act 502 include enabling a memory descriptor (e.g., an MDL) to be held by (e.g., cached for) a BufferEntry across a plurality of I/O operations, decreasing the CPU overheads of those I/O operations (experimentally, by approximately 10%).

As discussed, in some embodiments, the GetBuffer( . . . ) API receives an offset and length, and the buffer getter component 403 returns a partial MDL covering only a subset of the buffer. Thus, in some embodiments of act 502, at least one I/O request comprises an offset and length identifying a subset of the buffer, and returning at least the subset of the MDL for use by the at least one I/O request comprises returning a partial memory descriptor corresponding to the offset and length. Alternatively, the buffer getter component 403 may return a full memory descriptor. Thus, in some embodiments of act 502, at least one I/O request comprises an offset and length identifying an entirety of the buffer, and returning at least the subset of the memory descriptor for use by the I/O request comprises returning the memory descriptor in its entirety.

As shown, in embodiments, method 500 also comprises an act 503 of, based on a request from a memory manager, draining any pending I/O operations for the MDL. In some embodiments, act 503 comprises, based on a request from a memory manager to release an identified physical memory page in the set of physical memory pages, and based at least on a reference count indicating that there is at least one pending I/O request on the memory descriptor, setting a flag within the buffer entry data structure to prohibit future I/O requests from using the memory descriptor. In an example, based on a call to TryReleasePage( . . . ) by the memory manager 112, the page release component 406 determines from a reference count for buffer entry **115*a* that there is at least one pending I/O operation on MDL 116*a*, and sets a first flag (e.g., UNLOCK) within buffer entry 115*a*, preventing future I/O operations from utilizing MDL 116*a*. Technical effects of act 503** include enabling a memory manger to request that physical memory pages locked by a cached memory descriptor (e.g., an MDL) be freed.

As discussed, a call to TryReleasePage( . . . ) may include an address of a requested physical memory page, and the page release component 406 uses the PtoB map 117 to determine if there is a BufferEntry object that corresponds to the requested physical memory page. As such, in embodiments, act 503 comprises, using the identified physical memory page, identifying the reference to the buffer entry data structure from the P2B map. Additionally, in embodiments, act 503 comprises identifying the reference count within the buffer entry data structure (e.g., buffer entry **115*a***).

Method 500 also comprises an act 504 of releasing the MDL when no pending I/O operations remain. In some embodiments, act 504 comprises releasing the memory descriptor, including unlocking the set of physical memory pages, based at least on the reference count indicating that there is no pending I/O request on the memory descriptor. In an example, when a reference count for buffer entry **115*a* is zero and a first flag (e.g., UNLOCK) is set within buffer entry 115*a*, the MDL release component 405 releases/tears down MDL 116*a*. Technical effects of act 504** include using freeing physical memory pages based on use of a reference count.

In embodiments, the release of MDL **116*a* in act 504 is based on the memory manager 112 having initiated setting of the first flag (e.g., UNLOCK) within buffer entry 115*a* in act 503. Thus, in some embodiments, releasing the memory descriptor is also based on receiving a request from a memory manager to release at least one physical memory page in the set of physical memory pages. Alternatively, in embodiments, the release of MDL 116*a* in act 504 is based on the buffer consumer 110 having requested to free an MDL in act 502**. Thus, in some embodiments, releasing the memory descriptor is also based on receiving a request from the buffer consumer to deregister the buffer.

Accordingly, the embodiments herein provide a memory descriptor cache that caches a memory descriptor (e.g., an MDL) for a buffer over a plurality of I/O operations on the buffer, resulting in a probe-and lock of the underlying physical memory pages being held over a plurality of I/O operations. Locking memory pages for extended periods of time improves system behavior, and has been shown to lead to approximately a 10% reduction in processor utilization. Additionally, the embodiments herein implement a system of reference counts that enables a cached memory descriptor to be released (and any corresponding probed-and-locked memory pages to be unlocked) based upon a request by a memory manger (e.g., based on a physical page address) and/or by a memory buffer consumer. By enabling cached memory descriptors to be released upon request, the embodiments herein enable the memory manager to free physical memory pages when needed. This improves an OS kernel's success rate at constructing large memory pages (64K, 2 M, 1 G) on the fly and improves memory manager performance when doing so. This also enables hardware and software to scan for—and remove—faulty pages, preventing fatal system errors, and enables a GPU to timely perform GPU memory window mappings and unlock GPU memory pages to power down.

Embodiments of the disclosure may comprise or utilize a special-purpose or general-purpose computer system (e.g., computer architecture 100) that includes computer hardware (hardware 101), such as one or more processors (e.g., processor 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will appreciate that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services).

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. Such embodiments may include a data processing device comprising means for carrying out one or more of the methods described herein; a computer program comprising instructions which, when the program is executed by a computer, cause the computer to carry out one or more of the methods described herein; and/or a computer-readable medium comprising instructions which, when executed by a computer, cause the computer to carry out one or more of the methods described herein. The described embodiments are to be considered in all respects only as illustrative and not restrictive. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for caching a memory descriptor across a plurality of input/output (I/O) requests, the method comprising:

creating a memory descriptor that describes a layout of a set of physical memory pages assigned to a buffer, the creating the memory descriptor including assigning and locking the set of physical memory pages to the memory descriptor;

receiving a plurality of I/O requests on the buffer;

for each I/O request of the plurality of I/O requests on the buffer:

returning at least a subset of the memory descriptor for use by the I/O request, and using a reference count to track the I/O request as being pending on the memory descriptor; and releasing the memory descriptor, including unlocking the set of physical memory pages, based at least on the reference count indicating that there is no pending I/O request on the memory descriptor, wherein:

an I/O request of the plurality of I/O requests comprises an offset and length identifying a subset of the buffer, and wherein returning at least the subset of the memory descriptor for use by the I/O request comprises returning a partial memory descriptor corresponding to the offset and length; or an I/O request of the plurality of I/O requests comprises an offset and length identifying an entirety of the buffer, and wherein returning at least the subset of the memory descriptor for use by the I/O request comprises returning the memory descriptor in its entirety.

2. The method of claim 1, wherein assigning and locking the set of physical memory pages to the memory descriptor is triggered by receiving an initial I/O request in the plurality of I/O requests.

3. The method of claim 1, wherein assigning and locking the set of physical memory pages to the memory descriptor is triggered by a request to register the buffer.

4. The method of claim 1, wherein releasing the memory descriptor is also based on receiving a request from a memory manager to release a physical memory page in the set of physical memory pages.

5. The method of claim 1, wherein releasing the memory descriptor is also based on receiving a request from a buffer consumer to deregister the buffer.

6. The method of claim 1, wherein using the reference count to track each I/O request as being pending on the memory descriptor comprises:

incrementing the reference count based on receiving a request from a buffer consumer for at least the subset of the memory descriptor for use by the I/O request; and decrementing the reference count based on a receiving request from the buffer consumer to release at least the subset of the memory descriptor used by the I/O request.

7. The method of claim 1, further comprising, based at least on receiving a request from a buffer consumer to register the buffer:

creating a buffer entry data structure that includes a starting address and a buffer length for the buffer; and inserting the buffer entry data structure into a buffer entry list.

8. A method, implemented at a computer system that includes a processor, for caching a memory descriptor across a plurality of input/output (I/O) requests, the method comprising:

creating a memory descriptor that describes a layout of a set of physical memory pages assigned to a buffer, the creating the memory descriptor including assigning and locking the set of physical memory pages to the memory descriptor;

receiving a plurality of I/O requests on the buffer;

for each I/O request of the plurality of I/O requests on the buffer:

returning at least a subset of the memory descriptor for use by the I/O request, and using a reference count to track the I/O request as being pending on the memory descriptor;

releasing the memory descriptor, including unlocking the set of physical memory pages, based at least on the reference count indicating that there is no pending I/O request on the memory descriptor; and based at least on receiving a request from a buffer consumer to register the buffer:

creating a buffer entry data structure that includes a starting address and a buffer length for the buffer; and inserting the buffer entry data structure into a buffer entry list.

9. The method of claim 8, further comprising returning an address of the buffer entry data structure to the buffer consumer.

10. The method of claim 8, further comprising, based at least on assigning and locking the set of physical memory pages to the memory descriptor:

adding, to a page-to-buffer entry map, a mapping between the set of physical memory pages and a reference to the buffer entry data structure.

11. The method of claim 10, further comprising, based on a request from a memory manager to release an identified physical memory page in the set of physical memory pages:

using the identified physical memory page, identifying the reference to the buffer entry data structure from the page-to-buffer entry map.

12. The method of claim 11, further comprising:

identifying the reference count within the buffer entry data structure; and based at least on the reference count indicating that there is at least one pending I/O request on the memory descriptor, setting a flag within the buffer entry data structure to prohibit future I/O requests from using the memory descriptor.

13. The method of claim 8, wherein a buffer consumer is an IORing component, and the buffer is an IORing user registered buffer.

14. A computer system for caching a memory descriptor across a plurality of input/output (I/O) requests, comprising:

a processor; and a computer storage media that stores computer-executable instructions that are executable by the processor to cause the computer system to at least:

receive a request from a buffer consumer to register a buffer;

create a memory descriptor that describes a layout of a set of physical memory pages assigned to the buffer, creating the memory descriptor including assigning and locking the set of physical memory pages to the memory descriptor;

receive a plurality of I/O requests on the buffer;

for each I/O request of the plurality of I/O requests on the buffer:

return at least a subset of the memory descriptor for use by the I/O request, and use a reference count to track the I/O request as being pending on the memory descriptor; and release the memory descriptor, including unlocking the set of physical memory pages, based at least on the reference count indicating that there is no pending I/O request on the memory descriptor, wherein:

an I/O request of the plurality of I/O requests comprises an offset and length identifying a subset of the buffer, and wherein returning at least the subset of the memory descriptor for use by the I/O request comprises returning a partial memory descriptor corresponding to the offset and length; or an I/O request of the plurality of I/O requests comprises an offset and length identifying an entirety of the buffer, and wherein returning at least the subset of the memory descriptor for use by the I/O request comprises returning the memory descriptor in its entirety.

15. The computer system of claim 14, wherein assigning and locking the set of physical memory pages to the memory descriptor is triggered by receiving an initial I/O request in the plurality of I/O requests.

16. The computer system of claim 14, wherein assigning and locking the set of physical memory pages to the memory descriptor is triggered by a request to register the buffer.

17. The computer system of claim 14, wherein releasing the memory descriptor is also based on receiving a request from a memory manager to release a physical memory page in the set of physical memory pages.

18. The computer system of claim 14, wherein releasing the memory descriptor is also based on receiving a request from a buffer consumer to deregister the buffer.

19. The computer system of claim 14, wherein using the reference count to track each I/O request as being pending on the memory descriptor comprises:

incrementing the reference count based on receiving a request from a buffer consumer for at least the subset of the memory descriptor for use by the I/O request; and decrementing the reference count based on a receiving request from the buffer consumer to release at least the subset of the memory descriptor used by the I/O request.

20. The computer system of claim 14, wherein the computer-executable instructions are executable by the processor to cause the computer system to, based at least on receiving a request from a buffer consumer to register the buffer:

create a buffer entry data structure that includes a starting address and a buffer length for the buffer; and insert the buffer entry data structure into a buffer entry list.

* * * * *